(12) United States Patent
Nigmatulin et al.

(10) Patent No.: US 7,511,516 B2
(45) Date of Patent: Mar. 31, 2009

(54) METHODS AND SYSTEMS FOR MONITORING THE DISPLACEMENT OF TURBINE BLADES

(75) Inventors: Tagir R. Nigmatulin, Greenville, SC (US); Ariel Caesar-Prepena Jacala, Simpsonville, SC (US); Charles A. Bulgrin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 247 days.

(21) Appl. No.: 11/423,815

(22) Filed: Jun. 13, 2006

(65) Prior Publication Data

US 2007/0285110 A1 Dec. 13, 2007

(51) Int. Cl.
*G01R 27/08* (2006.01)
(52) U.S. Cl. ..................... 324/699; 324/691
(58) Field of Classification Search ................ 324/699, 324/701, 691, 705; 198/497
See application file for complete search history.

(56) References Cited

U.S. PATENT DOCUMENTS

| 6,717,420 | B2 * | 4/2004 | Eyraud et al. ............... 324/701 |
| 2003/0230466 | A1 * | 12/2003 | Swinderman et al. ....... 198/497 |
| 2004/0012151 | A1 * | 1/2004 | Beeck et al. ................ 277/415 |

* cited by examiner

*Primary Examiner*—Vincent Q Nguyen
(74) *Attorney, Agent, or Firm*—Sutherland Ashbill & Brennan

(57) ABSTRACT

A system for monitoring the displacement of turbine blades that includes a turbine blade with a cutting tooth and one or more sensor wires, each sensor wire including a severable portion, that become severed by the cutting tooth as turbine blade displacement occurs. The sensor wires may be embedded in a honeycomb, which may be an area of abradable material attached to turbine shrouds. The sensor wires may include a plurality of radial sensor wires embedded in the honeycomb at varying predetermined radial distances from a turbine rotor. The sensor wires also may include a plurality of axial sensor wires embedded in the honeycomb at varying predetermined axial locations along the length of the honeycomb.

17 Claims, 2 Drawing Sheets

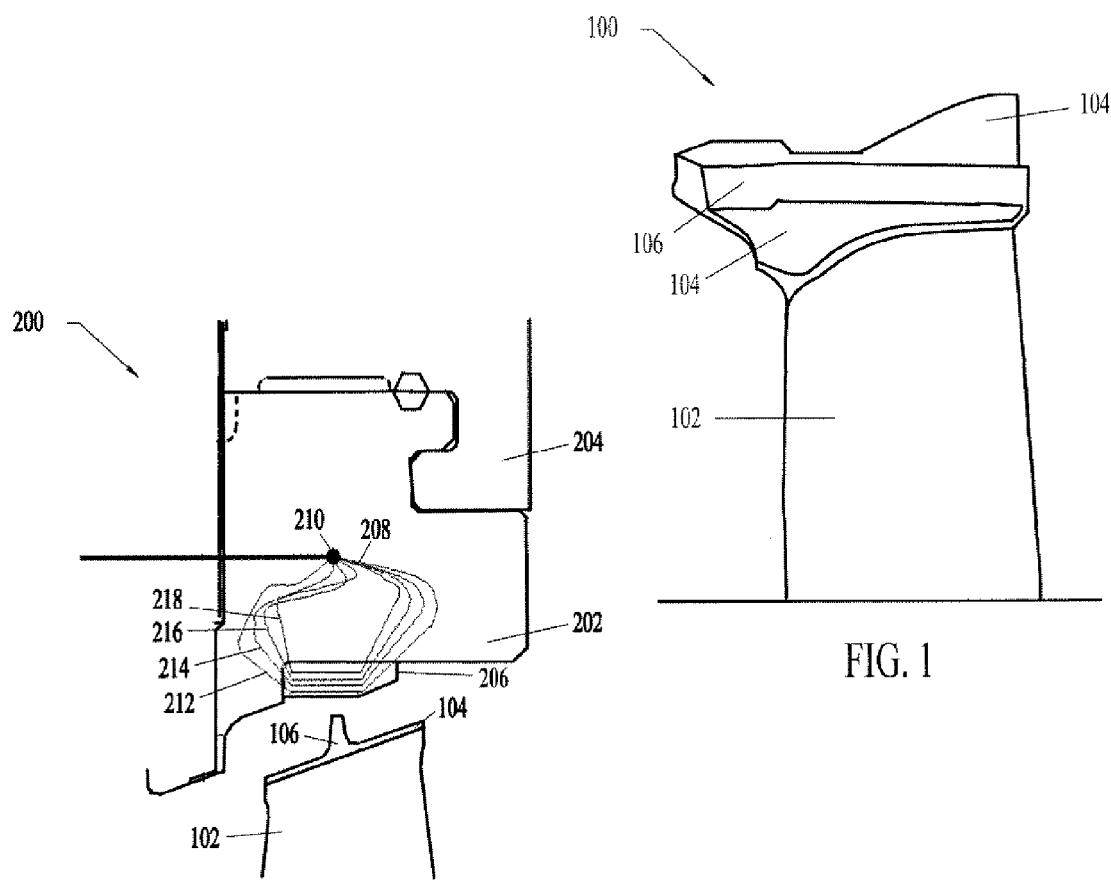
FIG. 1
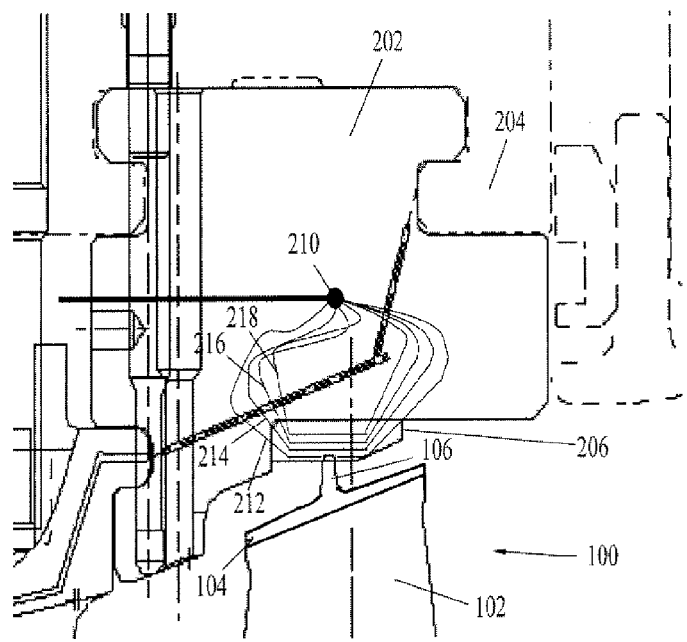
FIG. 2
FIG. 3

METHODS AND SYSTEMS FOR MONITORING THE DISPLACEMENT OF TURBINE BLADES

TECHNICAL FIELD

This present application relates generally to methods and systems for monitoring the displacement of turbine blades that occurs during operation of the turbine. More specifically, but not by way of limitation, the present application relates to methods and systems for monitoring the displacement of turbine blades through the placement of sensor wires.

BACKGROUND OF THE INVENTION

The turbine blades of industrial gas turbines and aircraft engines operate in a high temperature environment, where the temperatures regularly reach between 600° C. and 1500° C. Moreover, the general trend is to increase the turbine operating temperatures to increase output and engine efficiencies. Thermal stresses placed on the turbine blades associated with these conditions are severe.

In general, turbine blades undergo high level of mechanical stress due to the forces applied via the rotational speed of the turbine. These stresses have been driven to even higher levels in an effort to accommodate turbine blade design that include higher annulus areas that yield higher output torque during operation. In addition, the desire to design turbine blade tip shrouds of greater surface area has added addition weight to the end of the turbine blade, which has further increased the mechanical stresses applied to the blade during operation. When these mechanical stresses are coupled with the severe thermal stresses, the result is that turbine blades operate at or close to the design limits of the material. Under such conditions, turbine blades generally undergo a slow deformation, which is often referred to as "metal creep." Metal creep refers to a condition wherein a metal part slowly changes shape from prolonged exposure to stress and high temperatures. Turbine blades may deform in the radial or axial direction.

As a result, the turbine blade failure mode of primary concern in the aft end stages of a gas turbine is metal creep, and particularly radial metal creep (i.e., elongation of the turbine blade). If left unattended, metal creep eventual may cause the turbine blade to rupture, which may cause extreme damage to the turbine unit and lead to significant repair downtime. In general, conventional methods for monitoring metal creep in turbine blades include either: (1) attempting to predict the accumulated creep elongation of turbine blades as a function of time through the use of analytical tools such as finite element analysis programs, which calculate the creep strain from algorithms based on creep strain tests conducted in a laboratory on isothermal creep test bars; or (2) visual inspections and/or hand measurements conducted during the downtime of the unit. However, the predictive analytical tools often are yield inaccurate. And, the visual inspections and/or hand measurements are labor intensive, costly, and, often, also yield inaccurate results.

In any case, inaccurate predictions as to the health of the turbine blade, whether made by using analytical tools, visual inspection or hand measurements, may be costly. On the one hand, inaccurate predictions may allow the turbine blades to operate beyond their useful operating life and lead to a turbine blade failure, which may cause severe damage to the turbine unit and repair downtime. On the other hand, inaccurate predictions may decommission a turbine blade to early (i.e., before its useful operating life is complete), which results in inefficiency. Accordingly, the ability to accurately monitor the metal creep displacement of turbine blades may increase the overall efficiency of the turbine engine unit. Such monitoring may maximize the service life of a turbine blades while avoiding the risk of turbine blade failure. In addition, if such monitoring could be done without the expense of time-consuming and labor-intensive visual inspections or hand measurements, further efficiencies would be realized. Thus, there is a need for improved systems for monitoring or measuring the metal creep displacement of turbine blades.

BRIEF DESCRIPTION OF THE INVENTION

The present application thus may describe a system for monitoring the displacement of turbine blades that includes a turbine blade with a cutting tooth, and one or more sensor wires, each sensor wire including a severable portion, that may become severed by the cutting tooth as turbine blade displacement occurs. The system further may include comprising means for monitoring a status of each of the sensor wires. The means for monitoring the status of the sensor wires may include means for determining which of the sensor wires have been severed.

In some embodiments, the means for monitoring the status of the sensor wires may include means for applying a voltage across each of the sensor wires and means for determining when the circuit formed in the each of the sensor wires is open. In other embodiments, the means for monitoring the status of the sensor wires may include means for monitoring an electrical resistance across each of the sensor wires and means for determining when a change in the electrical resistance has occurred.

The one or more sensor wires may be embedded in a honeycomb. The honeycomb may be an area of abradable material attached to turbine shrouds. The one or more sensor wires may include a plurality of radial sensor wires embedded in the honeycomb at varying predetermined radial distances from a turbine rotor. The predetermined radial distances may occur at regular intervals. At least one of the radial sensor wires may include an indicator radial sensor wire. The indicator radial sensor wire may be embedded in the honeycomb at a predetermined radial distance from the a turbine rotor such that the severing of the indicator radial sensor wire by the cutting tooth indicates that the turbine blade, because of the radial elongation the turbine blade has experienced, has maximized its useful operating life. The system further may include means for sending notification when the indicator radial sensor wire is severed.

In some embodiments, the one or more sensor wires may include a plurality of axial sensor wires embedded in the honeycomb at varying predetermined axial locations along the length of the honeycomb. The predetermined axial distances occur at regular intervals.

The present application further may describe a method of determining the displacement of turbine blades in a turbine engine that includes the steps of: (1) monitoring one or more sensor wires that can become severed by a cutting tooth on the turbine blades as the displacement of the turbine blades occurs; and (2) quantifying the amount of displacement the turbine blades have experienced based on which of the one or more sensor wires becomes severed. The method further may include the step of applying a voltage across each of the sensor wires such that the step of monitoring the sensor wires includes determining if a circuit formed in each of the sensor wires is open. In some embodiments, the method may include the step of monitoring an electrical resistance across each of the sensor wires such that the step of monitoring the sensor wires includes determining if the electrical resistance across each of the sensor wires has changed.

The one or more sensor wires may include a plurality of radial sensor wires embedded in a honeycomb at varying predetermined radial distances from the turbine rotor. In other embodiments, the one or more sensor wires may include a plurality of axial sensor wires embedded in a honeycomb at varying predetermined axial locations along the length of the honeycomb. In such embodiments, the method may include the following steps: (1) determining the initial axial location of the cutting tooth by monitoring which of the axial sensor wires is severed by an initial cut made by the cutting tooth into the honeycomb; and (2) determining the direction and extent of an axial displacement of the turbine blades by monitoring which of the remaining plurality of sensor wires is severed next. The method further may include the step of sending notification about which of the sensor wires have been severed.

These and other features of the present application will become apparent upon review of the following detailed description of the preferred embodiments when taken in conjunction with the drawings and the appended claims.

BRIEF DESCRIPTION OF THE DRAWINGS

FIG. 1 is a perspective view of the end of an exemplary turbine blade accordingly to an exemplary embodiment of the present application.

FIG. 2 is a section view of a turbine blade displacement monitoring system according to an exemplary embodiment of the present application.

FIG. 3 is a section view of the turbine blade displacement monitoring system of FIG. 2 demonstrating its operation.

DETAILED DESCRIPTION OF THE INVENTION

Figure 4:
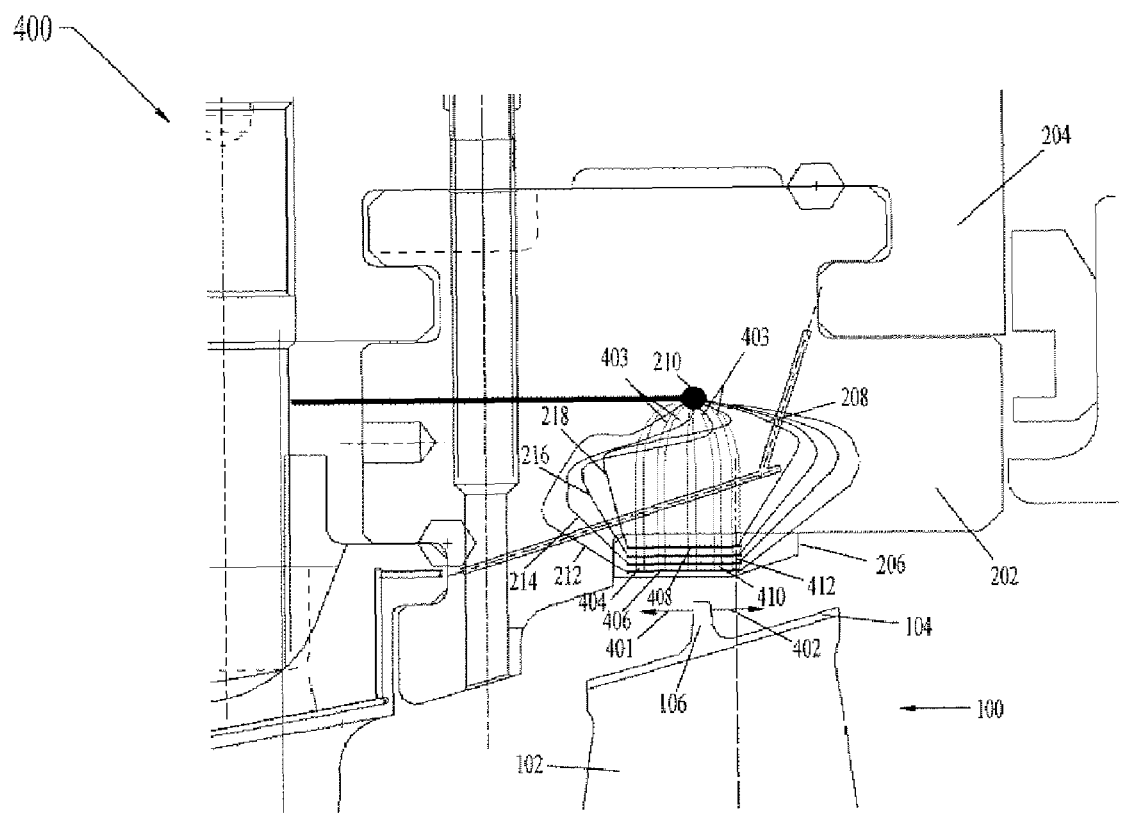
FIG. 4 is a section view of a turbine blade displacement monitoring system according to an alternative exemplary embodiment of the present application.

Referring now to the figures, where the various numbers represent like parts throughout the several views, FIG. 1 demonstrates a view of an end of a turbine blade 100 according to exemplary embodiments of the present application. The turbine blade 100 may include an airfoil 102, which extends from a base (not shown) of the turbine blade 100 to a tip shroud 104, which is attached to the end of the turbine blade 100. In operation, the airfoil 102 acts to convert the energy of the expanding exhaust gases from a combustor into mechanical energy. The tip shroud 104 may provide a surface area that runs substantially perpendicular to the surface of the airfoil 102. The surface area of the tip shroud 104 may help to hold the turbine exhaust gases on the airfoil 102 (i.e., does not allow the exhaust gases to slide over the end of the airfoil) so that a greater percentage of energy from the exhaust gases may be converted into mechanical energy by the turbine. Tip shrouds thusly may improve the performance of the gas turbine engine.

The turbine blade 100 also may include a cutting tooth 106 on a top surface of the tip shroud 104. The cutting tooth 106 may form a sharp ridge that juts out of the outer surface of the tip shroud 104. As discussed in more detail below, during the rotation of the turbine blade 100, the cutting tooth 106 may cut a groove in an area of soft metal, which because of its appearance is often referred to as a "honeycomb." As one of ordinary skill in the art will appreciate, the design of the cutting tooth 106 according to the present application may be significantly different from the design shown in FIG. 1, which is exemplary only. In general, the cutting tooth 106 may include any edge or protruding surface on the turbine blade 100. The groove cut into the soft metal by the cutting tooth 106 may form a beneficial labyrinth seal between the turbine blade 100 and a turbine shroud connected to the casing of the turbine.

FIG. 2 demonstrates a section view of a turbine blade displacement monitoring system 200, which may include the turbine blade 100 installed alongside a turbine shroud 202. The turbine shroud 202 is a stationary shroud that is connected to a turbine case 204. The turbine case 204 is a casing that surrounds the turbine rotor (not shown) and the turbine blades 100 installed thereon. The turbine shroud 202 may increase the efficiency of the turbine by directing the turbine exhaust gases onto the airfoil 104 of the turbine blade 100, thus increasing the mechanical energy harvested from the exhaust gases.

The turbine shroud 202 may include a honeycomb 206. As shown in FIG. 2, the honeycomb 206 may be attached to the turbine shroud 202 at a location directly above the turbine blade 100. As described, the honeycomb 206 may be a relative soft or abradable material. For example, the honeycomb 206 may be made of haynes 214. In addition, the honeycomb also may be made from graphite, feltmetal, a porous ceramic material, or other similar relatively soft metals or other porous materials. As used herein, the honeycomb 206 is defined to include any area of abradable material into which the rotating turbine blade 100 cuts during rotation. In general, cutting into the honeycomb 206 by the turbine blade 100 forms a beneficial labyrinth seal between the turbine blade 100 and the turbine shroud 202 or turbine case 204. The honeycomb 206 may be attached to the turbine shroud 202 by conventional methods. Being directly above the turbine blade 100, the honeycomb 206 may be positioned directly above the cutting tooth 106 of the turbine blade 100, which, as shown, may be located in the approximate midpoint of the turbine blade 100.

The turbine blade displacement monitoring system 200 further may include one or more radial sensor wires 208. The radial sensor wires 208 may originate at an electrical source 210 that is located in the turbine shroud 202 (as shown) or the turbine casing 204. Through conventional means, the electrical source 210 may monitor the condition of the radial sensor wires 208 and report the condition of the senor wires 208 to a control system (not shown).

The control system may comprise any appropriate high-powered solid-state switching device. The control system may be a computer; however, this is merely exemplary of an appropriate high-powered control system, which is within the scope of the application. For example, but not by way of limitation, the control system may include at least one of a silicon controlled rectifier (SCR), a thyristor, MOS-controlled thyristor (MCT) and an insulated gate bipolar transistor. The control system also may be implemented as a single special purpose integrated circuit, such as ASIC, having a main or central processor section for overall, system-level control, and separate sections dedicated performing various different specific combinations, functions and other processes under control of the central processor section. It will he appreciated by those skilled in the art that the control system also may be implemented using a variety of separate dedicated or programmable integrated or other electronic circuits or devices, such as hardwired electronic or logic circuits including discrete element circuits or programmable logic devices, such as PLDs, PALs, PLAs or the like. The control system also may be implemented using a suitably programmed general-purpose computer, such as a microprocessor or microcontrol, or other processor device, such as a CPU or MPU, either alone or in conjunction with one or more peripheral data and signal processing devices.

Given the perspective of FIG. 2, from the electrical source 210, the radial sensor wires 208 may extend downward through the turbine shroud 202 into the honeycomb 206. The radial sensor wires 208 may be positioned within the honeycomb 206 at varying radial distances or depths from the rotating axis of the turbine rotor. These radial depths may be predetermined and, thus, the position of each of the radial sensor wires 208 may be known to a turbine operator. The turbine operator, as used herein, may include a person or automated operating system that manages the operation of the turbine. For example, a first radial sensor wire 212 may be located near the surface of the honeycomb 206. A second radial sensor wire 214 may be buried deeper within the honeycomb 206 than the first radial sensor wire 212 and, thus, may maintain a position that is a greater distance from the cutting tooth 106 than the first radial sensor wire 212. A third radial sensor wire 216 may be buried deeper within the honeycomb 206 than the second radial sensor wire 214 and, thus, may maintain a position that is a greater distance from the cutting tooth 106 than the second radial sensor wire 214. A fourth radial sensor wire 218 may be buried deeper within the honeycomb 206 than the third radial sensor wire 216 and, thus, may maintain a position that is a greater distance from the cutting tooth 106 than the third radial sensor wire 216.

The spacing of the radial sensor wires 208 may be regular. In some embodiments, the radial sensor wires 208 may be spaced at regular intervals that measure approximately 10 to 20 mm, though this distance may vary significantly depending on the application. Those of ordinary skill in the art will appreciate that more or less radial sensor wires 208 may be used and that the description of four sensor wires is exemplary only. In some embodiments, only one radial sensor wire 208 may be used.

In operation, the mechanical and thermal stresses associated with the turbine environment may cause the turbine blades 100 to slowly deform. This slow deformation, or metal creep, may cause the turbine blade 100 to elongate, i.e., increase the radius from the end of the turbine blade 100 to the turbine rotor. Over time, the turbine blade 100 may "creep" such that the cutting tooth 106 cuts a deeper and deeper radial groove in the honeycomb 206, which is demonstrated in FIG. 3 by the overlapping of the cutting tooth 106 and the honeycomb 206. As described, this radial groove may form the labyrinth seal between the turbine blade 100 and the turbine shroud 202. Note that the invention disclosed herein may monitor displacement of the turbine blade 100 caused by any means, including, but not limited to, metal creep. The description of metal creep as causing the displacement is exemplary only.

The radial creep (i.e., radial elongation) of the turbine blade 100 also may begin to sever the radial sensor wires 208 imbedded in the honeycomb 206. More specifically, as the cutting tooth 106 of the turbine blade 100 cuts into the honeycomb 206, the cutting tooth 106 also may sever, in a one-by-one manner, the radial sensor wires 208 embedded in the honeycomb 206. As shown in FIG. 3, the turbine blade 100 has elongated to the extent that the cutting tooth 106 of the turbine blade 100 has severed the first sensor wire 212.

The radial creep or elongation of the turbine blade 100, therefore, can then be monitored and quantified by monitoring the status of the radial sensor wires 208 (i.e., which of the radial sensor wires 208 has been severed). This may be accomplished in several ways. For example, the electrical source 210 may apply a voltage through each of the radial sensor wires 208. When one of the senor wires 208 is severed, a change in the voltage may be registered (for example, an open circuit may be registered) by the control system in that particular radial sensor wire 208. Alternatively, an electrical resistance may be monitored in each of the radial sensor wires 208 such that, when one of the radial sensor wires 208 is severed, a change in the resistance may be registered (for example a substantially infinite electrical resistance is registered) by the control system.

Using either of these methods (or other similar systems), the control system may track the status of the several radial sensor wires 208 (i.e., determine and keep track of which of the radial sensor wires 208 have been cut). Because the radial sensor wires 208 are embedded at varying known depths, knowing which of the radial sensor wires 208 have been cut by the cutting tooth 106 of the turbine blade 100 may allow the turbine operator to know the current radial position of the cutting tooth 106 (i.e., the length of the radius from the cutting tooth 106 to the turbine rotor). The current position of the cutting tooth 106 then may be compared to a known starting position of the cutting tooth 106 (i.e., the radial position of the cutting tooth 106 at the installation of the turbine blade 100) to determine the elongation (i.e., radial growth due to metal creep) that the turbine blade 100 has experienced during its operation within the turbine.

In this manner, the radial metal creep of the turbine blade 100 may be automatically quantified and tracked during turbine operation. One of the radial sensor wires 208 may be buried at a depth that, when severed, indicates the useful life of the turbine blade 100 is near exhaustion and/or risk of turbine blade failure is inordinately high due to the radial metal creep the turbine blade 100 has experienced. When this particular radial sensor wire 208 is severed, the control system may give an indication of this condition by email, computer alert, or other similar means to the turbine operator so that the turbine blade 100 or set of turbine blades may be further inspected and/or replaced. In this manner, the useful life of the turbine blade 100 may be maximized without experiencing an inordinately high risk of turbine blade failure due to radial metal creep.

A similar method and system also may be used to track metal creep of the turbine blade 100 in the axial direction. FIG. 4 demonstrates a section view of an alternative embodiment of the present application, a turbine blade displacement monitoring system 400. As stated, in addition to experiencing deformation in the radial direction, the turbine blade 100 may creep in the axial direction. The axial direction is indicated on FIG. 4 by arrows 401, 402. Thus, instead of (or in addition to) embedding the radial sensor wires 208 in varying radial depths in the honeycomb 206, one or more axial sensor wires 403 may be embedded along the length of the honeycomb 206. The axial sensor wires 403 may loop down from the electrical source 210 (through the turbine shroud 202 and the honeycomb 206) to a location short of the surface of the honeycomb 206. The loop that the axial sensor wires 403 makes within the honeycomb 206 may be substantially perpendicular to the outer face of the honeycomb 206.

As shown, the axial sensor wires 403 may include a first axial sensor wire 404, a second axial sensor wire 406, a third axial sensor wire 408, a fourth axial sensor wire 410, and a fifth axial sensor wire 412. The spacing of the axial sensor wires 403 may be regular. In some embodiments, the axial sensor wires 208 may be spaced at regular intervals that measure approximately 10 to 20 mm, though this distance may vary significantly depending on the application. Those of ordinary skill in the art will appreciate that more or less axial sensor wires 403 may be used and that the inclusion of five axial sensor wires 403 in FIG. 4 is exemplary only.

In operation, the turbine 100 may make an initial cut into the honeycomb 206 during operation. As aligned in FIG. 4, the initial cut may sever the third axial sensor wire 408. The axial sensor wires 403 may be monitored by the control system in the same manner as that described above for the radial sensor wires 208. The control system, thus, may register that the third axial sensor wire 408 has been severed. This initial cutting of an axial sensor wire 403 may provide the control system and turbine operator with information regarding the initial axial location of the cutting tooth 106 of the turbine blade 100. During operation, the turbine blade 100 may creep axially, thus widening the initial cut. For example, the turbine blade 100 may creep in the direction of arrow 402. In this case, after a sufficient amount of turbine operation (and the related axial creep caused by the turbine operation), the cutting tooth 106 may cut the fourth axial sensor wire 410. Given the initial cut of the third sensor wire 408 and the subsequent cut of the fourth sensor wire 410, the turbine operator will have accurate information concerning the direction and extent of the axial creep of the turbine blade 100.

At some point, for example after the severing of an additional axial sensor wire 403 or several other axial sensor wires 403, it may be determine based on the extent of the axial creep sustained by the turbine blade 100 that the useful life of the turbine blade 100 is near exhaustion and/or risk of failure is inordinately high. The control system may give an indication of this condition by email, computer alert, or other similar means to the turbine operator so that the turbine blade 100 may be replaced. In this manner, the useful life of the turbine blade 100 may be maximized without experiencing an inordinately high risk of turbine blade failure due to axial metal creep.

It should be apparent that the foregoing relates only to the described embodiments of the present application and that numerous changes and modifications may be made herein without departing from the spirit and scope of the application as defined by the following claims and the equivalents thereof.

We claim:

1. A system for monitoring the displacement of turbine blades, comprising:
    a turbine blade comprising a cutting tooth; and
    a plurality of radial sensor wires embedded in an abradable material at varying predetermined radial distances from a turbine rotor, each radial sensor wire defining an independent electrical circuit, each radial sensor wire comprising a severable portion positioned to become severed by the cutting tooth in response to displacement of the turbine blade.

2. The system of claim 1, further comprising means for monitoring a status of each of the radial sensor wires.

3. The system of claim 2, wherein the means for monitoring the status of the radial sensor wires comprises means for applying a voltage across each of the radial sensor wires and means for detecting a change in the voltage across any of the radial sensor wires.

4. The system of claim 2, wherein the means for monitoring the status of the radial sensor wires comprises means for monitoring an electrical resistance across each of the radial sensor wires and means for detecting a change in the electrical resistance in any of the radial sensor wires.

5. The system of claim 1, wherein at least one of the radial sensor wires comprises an indicator radial sensor wire, the indicator radial sensor wire being embedded at the predetermined radial distance associated with an end-of-life radial elongation of the turbine blade, such that the severing of the indicator radial sensor wire by the cutting tooth indicates that the turbine blade has elongated to the end-of-life radial elongation.

6. The system of claim 5, further comprising means for sending notification when the indicator radial sensor wire is severed.

7. The system of claim 1, further comprising a plurality of axial sensor wires embedded in the abradable material at varying predetermined axial locations along the length of the abradable material.

8. A method of determining a displacement of a turbine blade in a turbine engine, comprising:
    monitoring a plurality of radial sensor wires, the sensor wires being embedded in an abradable materials at varying predetermined radial distances from a turbine rotor, each of the radial sensor wires forming an independent circuit, each of the radial sensor wires being positioned to become severed by a cutting tooth on the turbine blade in response to displacement of the turbine blade; and
    quantifying the displacement of the turbine blade based at least in part on which of the radial sensor wires is severed.

9. The method of claim 8, wherein monitoring the radial sensor wires comprises determining if the independent circuit formed in each of the radial sensor wires is open.

10. The method of claim 8, wherein monitoring the radial sensor wires comprises determining if at least one of a voltage or an electrical resistance across each of the radial sensor wires has changed.

11. The method of claim 8, further comprising a plurality of axial sensor wires embedded in the abradable material at varying predetermined axial locations along the length of the abradable material.

12. The method of claim 11, further comprising:
    determining an initial axial location of the cutting tooth by monitoring which of the axial sensor wires is severed by an initial cut made by the cutting tooth into the abradable material; and
    determining an axial displacement of the turbine blade by monitoring which of the remaining plurality of axial sensor wires is severed next.

13. The method of claim 8, further including sending notification about which of the sensor wires have been severed.

14. A system for monitoring the displacement of turbine blades, comprising:
    a turbine blade associated with a rotor, the turbine blade being rotated by the rotor in a plane of rotation, the turbine blade defining a radial direction extending outward from the rotor to a distal end of the turbine blade;
    a plurality of radial sensor wires positioned adjacent the distal end of the turbine blade, the radial sensor wires being spaced apart from each other in the radial direction, each radial sensor wire comprising a portion that extends in a transverse direction, the transverse direction being generally transverse to the plane of rotation of the turbine blade; and
    a cutting tooth associated with the distal end of the turbine blade, the cutting tooth being relatively narrower in the transverse direction than the portion of the radial sensor wire that extends in the transverse direction, such that when the turbine blade is displaced in the radial direction, the turbine blade severs the portion of one or more of the radial sensor wires.

15. The system of claim 14, wherein the cutting tooth is relatively narrower in the transverse direction than a width of the distal end of the turbine blade in the transverse direction.

16. The system of claim 14, further comprising a plurality of axial sensor wires, the axial sensor wires being spaced apart from each other in the transverse direction, such that when the turbine blade is displaced in the transverse direction, the cutting tooth severs one or more of the axial sensor wires.

17. The system of claim 16, wherein:
each of the radial and axial sensor wires defines an independent electrical circuit; and
the system further comprises means for detecting which of the independent circuits is open.

* * * * *